Oct. 20, 1953  M. S. LIPMAN  2,655,932
DRAIN VALVE

Filed March 11, 1947  2 Sheets-Sheet 1

INVENTOR.
Maurice S. Lipman.

BY Charles S. Wilson
ATTORNEY.

Oct. 20, 1953   M. S. LIPMAN   2,655,932
DRAIN VALVE
Filed March 11, 1947   2 Sheets-Sheet 2
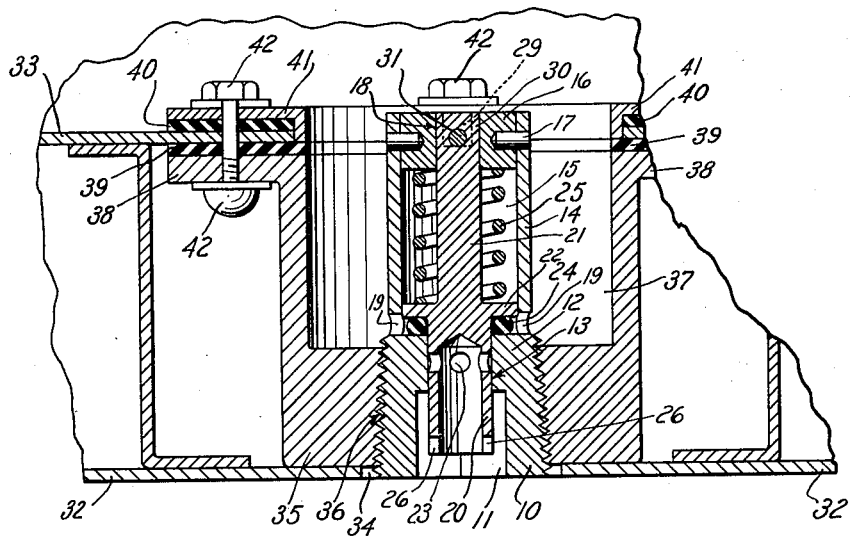
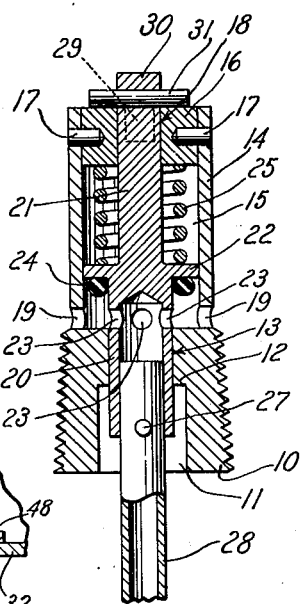
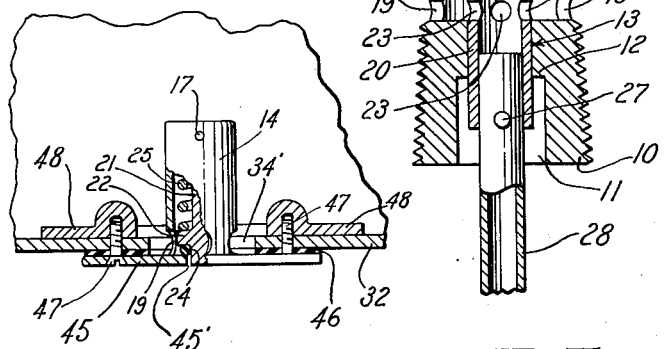
INVENTOR.
Maurice S. Lipman.
BY
ATTORNEY.

Patented Oct. 20, 1953

2,655,932

UNITED STATES PATENT OFFICE 2,655,932

DRAIN VALVE

Maurice S. Lipman, Hempstead, N. Y., assignor to Republic Aviation Corporation, near Farmingdale, N. Y., a corporation of Delaware Application March 11, 1947, Serial No. 733,791

9 Claims. (Cl. 137—344)

This invention relates generally to valves and particularly to drain valves for use on aircraft.

The instant invention proposes a valve which can be employed to drain the interior of an aircraft component, or to drain any container or tank housed therein, without creating any irregularity in, or projection on the skin of the associated component.

By the elimination of access openings and doors in conjunction with the drain valve, and by providing for the operation of the valve entirely from the exterior of the aircraft, or of any component thereof, the present invention accomplishes a saving in weight and a reduction in cost, as well as simplifies the draining of aircraft components and/or tanks therein contained.

Among its other objects this invention contemplates a valve of this type, which can be remotely opened or closed thereby doing away with the necessity of climbing over or to the aircraft components to manipulate access doors or to operate the valves.

With the above and other objects in view as will be apparent, this invention consists in the construction, combination and arrangement of parts all as hereinafter more fully described, claimed and illustrated in the accompanying drawings, wherein:

Fig. 5 is an enlarged central vertical section through the valve and cooperating fitting and structure to illustrate the relative positions of its elements when the valve is closed;

Fig. 6 is a central longitudinal or vertical section through the valve to illustrate the relative positions of its elements when locked in open or draining conditions; and Fig. 7 is a fragmentary section through the skin of an aircraft to disclose a modification of the means by which the present drain valve, shown in elevation, may be mounted in and supported thereby.

Figure 1:
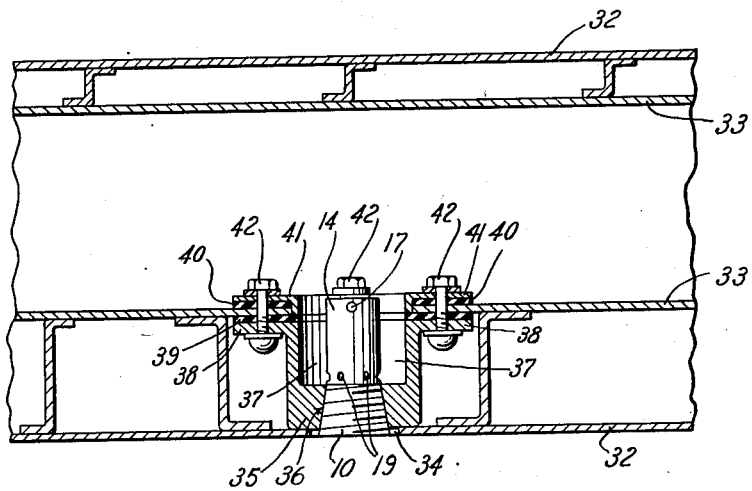
Fig. 1 is a sectional view through an aircraft component, such as a wing, and a tank contained therein, illustrating in elevation a drain valve constructed and operatively arranged in conjunction with the tank as taught by this invention.

It is recognized, and in fact required, that means be provided to drain the interior of hollow aircraft components and/or to drain any fluid containers or tanks incorporated in the aircraft structure.

A variety of means and valves have heretofore been used for this purpose and most of these have required relatively large access openings in the skin of the aircraft. Hence a door or closure is essential for each access opening, in order to maintain a substantially clean, smooth and uninterrupted skin, and each door and opening must be equipped with the customary fittings for reinforcing the skin adjacent and defining the opening and for securely, but removably, mounting the door therein. The drain valve used in this type of installation is contained entirely within the limits of the space defined by the skin so that it is inaccessible and can be operated manually only by reaching through the access opening. A rotary valve is usually a part of this type of installation and is provided with a handle for its manipulation. To prevent any accidental opening of the rotary valve it is wired and sealed in its closed position thereby making it necessary to remove the wire and seal to open the valve and the subsequent rewiring and resealing thereof, every time the valve is used.

To drain the tanks of an aircraft having valve installations of this type also requires collateral equipment in the form of ladders, scaffolds, etc. to the end that the access doors and valves may be reached, and manipulated, as well as tools for removing and replacing the access doors and for severing and replacing the wires and seals. It is manifest, therefore, that these prior valve assemblies are not only costly and complicated to instal but are inconvenient and expensive to use after installation.

To overcome the many obvious disadvantages of and objections to these former valve assemblies, the instant invention proposes a novel installation of a specially constructed valve wherein the outer extremity of the valve is situated in and fully occupies a relatively small opening in the skin of the aircraft and terminates flush with the outer surface of said skin. Easily accessible from the ground, the outer extremity of the valve is adapted to receive a tool by which it may be opened, means being provided to lock it in that position. When the draining is completed the same tool is used to unlock the valve, whereupon it automatically resumes its closed position.

The details of construction of the valve per se are fully illustrated in Figs. 3, 4, 5 and 6 and the installation thereof is disclosed in Figs. 1, 2, 5 and 7.

As shown in Figs. 5 and 6 the instant drain valve is carried and supported by an exteriorly threaded base 10, the exterior shape and threads of which may conform to any convenient standard. This base 10 has a concentric or central socket 11 in its outer end which extends partly through the base to create an end wall 12 at the inner end of the base. Concentrically with respect to the longitudinal axis of the base 10 and its socket 11, the wall 12 is pierced by a passage 13 which in effect comprises a reduced and cylindrical extension of said socket. It will be observed (Fig. 3) that the socket 11 is hexagonal for the reception of and coaction with any suitable tool for rotating the base 10 to thread it into its mounting or support associated with the skin of the aircraft component.

A cylindrical valve casing or barrel 14 is rigidly secured to the inner end wall 12 of the base 10 and is peripherally concentric to said wall as well as concentric to the passage 13 through it. The chamber 15, defined by the barrel 14, is closed at its lower end by the inner end wall 12 of the base 10 which constitutes the bottom of the barrel or casing 14. The opposite end of the barrel 14 is closed by a plug 16 rigidly held and secured within the extremity of the barrel by the pins 17 piercing both the casing 14 and the fixed plug 16. Any other adaptable means can be employed for rigidly and permanently securing the plug 16 in the inner extremity of the housing or barrel 14 with its outer face flush with the outer extremity of the barrel. This plug 16 is centrally traversed by a passage 18 aligned axially with the passage 13 of the wall 12 and concentric to the axis of the barrel or casing 14 and to the axis of the base 10. The lower end of the casing or barrel 14 adjoining the end wall 12 of the base 10 is pierced by a series of apertures or openings 19 by which access is established between the exterior and the interior of the casing or barrel 14. The foregoing elements to wit: the base 10 and the casing or barrel 14 together with the plug 16, arranged as aforesaid, comprise the housing of the valve and when this valve, as a unit, is associated with an aircraft component it is mounted and supported by the base 10 as will be described.

A valve stem is mounted for reciprocation in the passages 13 and 18 respectively of the end wall 12 of the base 10 and of the plug 16. This stem comprises a hollow, cylindrical lower section 20 mounted for reciprocation in the passage 13 of the end wall 12 and a co-extensive upper section 21 which is mounted for simultaneous reciprocation in the passage or opening 18 in the plug 16. These sections 20 and 21 of the stem are preferrably integral one with the other and are defined and separated by an outstanding flange 22, the periphery or circumference of which fits snugly against the inner face of the housing or barrel 14 for free reciprocation within the chamber 15 thereof. The lower hollow section 20 of the stem adjacent the flange 22 is pierced by a series of openings 23 which, when the valve stem is at the upper extremity of its path of movement, are positioned above the end wall 12 of the base 10 to establish communication between the interior of the section 20 and the lower end of the chamber 15 of the housing or barrel 14 in substantially the plane of the openings 19 in the lower end of the barrel or casing 14. Thus when the valve stem is at the upper end of its path of the movement, as illustrated in Fig. 6, communication is established between the exterior of the housing or barrel 14 and the interior of the lower section 20 of the valve stem through the openings 19 in the barrel 14 and the openings 23 in the section 20 of the stem. Reversely, when the valve stem is at the lower end of its path of movement, this communication is broken because the openings 23 in the upper extremity of the lower section 20 of the stem are positioned below the outer surface of the end wall 12 of the base 10 and within the passage 13 of said end wall, as illustrated in Fig. 5. As will be described the valve is sealed to prevent leakage when its elements assume this last position.

To seal the valve in its closed position (Fig. 5) and to prevent any fluid from passing from the exterior of the barrel or casing 14 into the interior of the lower stem section 20, a compressible and flexible seal 24, in the form of an O-ring of elastic material such as rubber, embraces the lower section 20 of the valve stem adjacent the flange 22 and reciprocates with the valve stem while maintaining this position. Therefore, when the valve stem is in its lower position, as shown in Fig. 5, the O-ring or packing gland 24 bears against the bottom of the casing or barrel 14 and is distorted into sealing contact by the pressure of the flange 22. The position of the lower section 20 of the valve stem shown in Fig. 5 with the openings 23 thereof within the passage 13 of the end wall 12 together with the action of the packing gland or O-ring seal 24 effectively prevents the passage of any fluid from the exterior of the casing 14 to the interior of the lower section 20 of the stem. As the valve stem moves upwardly from the position shown in Fig. 5 to that shown in Fig. 6 the O-ring or gland 24 moves with it and away from its contact with the outer faces of the end wall 12 of the base 10.

The normal position of the elements of the valve is illustrated in Fig. 5 and this position is maintained by a helical, expansion spring 25 interposed between the inner face of the plug 16 and that face of the flange 22 opposed to the packing gland or seal 24 to surround the upper section 21 of the valve stem. This spring normally tends to seat the O-ring or seal 22 upon the adjoining or outer face of the end wall 12 of the base 10 and to position the openings 23 in the lower hollow section 20 of the valve stem within the passage 13 of said end wall, all as shown in Fig. 5. In this condition, the valve is closed and sealed.

To open the valve, the valve stem must be elevated against the action of the spring 25, to move the stem and its associated elements to the positions shown in Fig. 6. To that end, the lower extremity of the section 20 of the stem is provided with the diametrically opposed slots 26 which receive the transverse pin 27 carried by a special tool 28. The insertion of the tool 28 in the hollow extremity of the lower section 20 of the valve stem and the seating of the projecting ends of its pin 27 in the opposed slots 26 of the valve stem not only permits the valve stem to be elevated by a lifting force on the tool 28 but also enables the valve stem to be rotated as a unit by the rotation of the tool 28, for purposes which will be hereafter apparent.

When the valve is elevated so that its parts assume the draining or open position shown in Fig. 6, it is desirable to lock and maintain this position until the draining is complete. To that end the outer face of the plug 16 is grooved, as at 29, upon one of its diameters and upon opposite sides of the passage 18 through said plug. The outer end portion 30 of the upper section 21 of the valve stem is pierced by a transverse pin 31 projecting at its ends beyond the upper section 21. The elevation of the valve stem against the action of the spring 25, as shown in Fig. 6 and its rotation through 90 degrees by the tool 28 causes the projecting portions of the pin 31 to overlie the outer face of the plug 16 between the grooves 29 therein thereby holding and locking the valve stem in its elevated position. The reverse, or continued, rotation of the tool 28 through 90 degrees brings the projecting ends of the pin 31 into alignment with the slots 29 in the outer face of the plug 16, whereupon the removal of the tool 28, or the removal of the lifting force thereon, permits the spring 25 to seat the projecting ends of the pin 31 in the grooves or slots 29 of the plug 16 and withdraw the outer end portion 30 of the valve stem into the casing or barrel 14 until its extremity is flush with the outer face of the plug 16. This action of the spring 25 returns the valve elements to their normal sealing or closed position shown in Fig. 5.

The tool 28 may be of any length to reach the installed valve from the ground and comprises a hollow cylinder having a diameter permitting its insertion in and its removal from the outer extremity of the hollow, lower section 20 of the valve stem. Thus when the tool is inserted in the section 20 of the valve stem and the valve stem is elevated or raised along its axis by a lifting force on the tool, as shown in Fig. 6, fluid from the exterior of the housing or barrel 14 may pass freely through the openings 19 in the housing or barrel and the substantially aligned openings 23 at the upper end of the lower section of the valve stem to the interior of the latter whence it can drain into and through the hollow tool 28. This prevents any slopping, spilling or wasting of the fluid and permits its delivery to a container associated with the outer extremity of the tool 28. The removal of the tool 28 after the valve stem has been locked in its elevated position leaves this container, in alignment with the draining stream of fluid from the lower section 20 of the stem.

From the foregoing, it will be seen that the valve may be operated in either direction by the tool 28 from the ground or any remote point, the distance whereof from the valve being determined by the length of the tubular tool 28.

The valve heretofore described may be associated with an aircraft structure component in a number of ways, all of which installations are characterized by accessibility from the ground and the maintenance of the outer or exposed end of the valve assembly flush with the skin of the component. In Figs. 1 and 5, where the aircraft component comprises a wing section, the skin 32 thereof defines a cavity in which a tank 33 is housed or contained. This tank 33 is of any standard construction and may be either metallic or fabric. An opening 34 is provided in the skin 32 of the under surface of the wing section at the point determined for draining and is associated with a chambered fitting 35 resting upon and secured to the inner face of the skin 32 at and surrounding the opening 34. This fitting braces the skin 32 at and adjacent the opening 34 and is provided with an internally threaded passage 36 for the reception and securing of the base 10 of the valve. When the base 10 is completely threaded into the passage 36 of the fitting, the outer extremity of the base 10 is situated flush with the outer surface of the skin 32 and the barrel or casing 14 of the valve is within the chamber 37 of the fitting. The positioning the barrel or casing 14 within the chamber 37 of the fitting brings the openings 19 thereof above the bottom of the chamber 37 so that fluid from within the tank 33, entering the chamber 37, can freely pass through the openings 19 to the interior of the casing or barrel 14 to be drained therefrom through the lower section 20 of the valve stem when the openings 23 of the latter are located above the end wall 12 of the base in substantial alignment with the openings 19. This fitting 35 may be secured to the skin 32 by welding, rivets, screws or any other adaptable fastening means and it is to be attached to the tank structure 33. For this purpose an outstanding flange 38 is provided at the upper or inner end of the fitting to be positioned under the wall of the tank 33 adjacent to and defining an opening therein in alignment with and above the opening 34 in the skin. Between the flange 38 and the wall of the tank 33 is a sealing gasket 39 and above the wall of the tank 33 at that point is a similar gasket 40, these gaskets 39 and 40 being aligned one with the other. A clamping ring 41 is disposed over the upper gasket 40 and the whole assembly is secured together by a bolt 42 passing through the flange 38, the gaskets 39 and 40 and the clamping ring 41. The tightening of the bolt 42 places the gaskets 39 and 40 under compression and prevents any leakage of the fluid within the tank 33 around the flange 38.

The foregoing assembly is designed for metal or fabric tanks housed within the component and it is apparent that the fluid within the tank 33 at all times fills the cavity 37 of the fitting 35 but is prevented from leaving this cavity because of the compression placed on the O-ring or seal 24 by the flange 22 under the influence of the spring 25 in combination with locating the openings 23 within passage 13 of base 10 below the outer face of the end wall 12. However, when the valve is elevated by the tool 28, as shown in Fig. 6, the fluid within the cavity or chamber 37 flows through the openings 19 and 23 into the interior of the lower section 20 of the valve stem and from there is discharged through the body of the tool 28. It is to be observed that the valve and its components are entirely contained within the aircraft component and that only a relatively small opening is provided in the skin 32 which is largely occupied in the plane of the skin 32 by the outer extremity of the base of the valve 10. Once the valve stem is locked in its elevated position (Figs. 4 and 6) the tool 28 may be removed from its cooperation with the stem until it is desired to close the valve.

Figure 2:
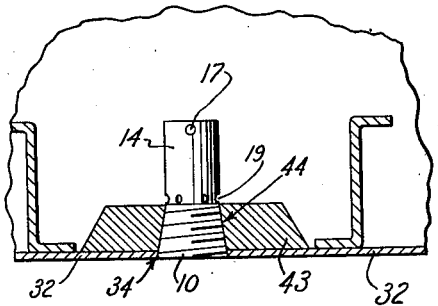
Fig. 2 is a fragmentary sectional view through an aircraft component showing a modified means for mounting the valve.
Figure 4:
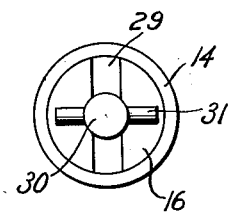
Fig. 4 is an elevation of the inner extremity of the valve, showing the relative positions of certain of its elements when the valve is locked in its open or draining position.
Figure 3:
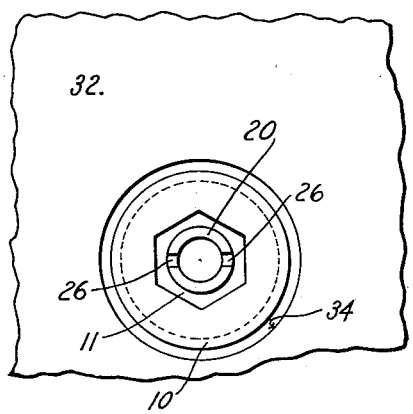
Fig. 3 is an elevation of the outer extremity of the present valve and of a fragment of the surrounding skin.

In Figs. 2 and 7 are shown modifications of the mounting for the present valve which are especially susceptible of use in conjunction with integral tanks, i. e. wherein the skin of the aircraft component also comprises the wall of the tank, but which are also of application and use in conjunction with other types of tanks.

The mounting in Fig. 2 consists of a block 43 seated on the inner surface of the skin 32, having a threaded passage 44 extending through it in alignment with an opening in the skin. This block 43 overlaps the skin 32 surrounding the valve opening and is there fixedly secured by any suitable means such as rivets, screws, welds, etc. so that it becomes, in effect, a permanent part of the skin. The base 10 of the valve is threaded into the passage 44 until its outer extremity is flush with the outer surface whereupon the barrel or casing 14 projects into the tank with the openings 19 therein free and clear above the inner face of the block. When so positioned the valve operates and is operated identically as above described.

The mounting disclosed in Fig. 7 is used with a valve which is modified to the extent of eliminating the base 10 of the type shown in Figs. 1 to 6 inc. and substituting a base comprising a plate 45 in lieu thereof. The valve barrel or casing 14 is secured to one face of the plate 45 with the openings 19 therein disposed above the inner face of the plate. When thus mounted on the plate 45 the the lower end of the chamber 15 of the barrel or casing 14 is in registration with an opening 45' in the plate 45 and the valve stem and seal 24 cooperates with the face of said plate in the same manner as these elements coact with the face of the end wall 12 of the base 10 in the preferred embodiment of the invention. To mount the valve and plate 45 in association with the skin 32, an opening 34' is provided in the latter surrounded by a sealing gasket 46 to be gripped between the edge portion of the plate 45 and the outer face of the skin. A series of screws 47 pierce the plate 45 adjacent its periphery as well as the gasket 46 and skin 32 and at their inner ends are threaded into a ring 48 secured to the inner face of the skin adjoining the opening 34' therein. The valve shown in Fig. 7 operates and is operated the same as that shown in Figs. 1 to 6 inc.

What is claimed is:

1. A valve comprising a hollow casing having a series of openings in its wall adjacent one of its ends, a base associated with that end of the casing having said openings and provided with a socket and communicating passage in axial alignment with said casing, a plug closing the end of the casing opposed to said base, said plug being pierced by a passage in axial alignment with the casing and having opposed grooves in its outer face, a valve stem mounted for reciprocation and rotation in the aligned passages, the lower end of said stem being hollow and situated in the passage of said base and provided with laterally opening apertures at its inner end, an outstanding flange on the stem within the casing adjacent said apertures, a transverse pin at the opposite end of the stem situated exteriorly of said casing to operate over the exposed face of the plug upon rotation of the stem, a spring interposed between said flange and said plug to seat the ends of said pin in the grooves of the plug when aligned therewith, a seal carried by the stem against one face of the flange to bear against said base when said pin seats in the grooves aforesaid, and means whereby the valve stem may be lifted against the action of said spring and rotated to move said pin into and out of alignment with said grooves.

2. A valve comprising a hollow valve casing having inlet means and a constriction adjoining each of its ends, a stem mounted for reciprocation in said constrictions, a transverse flange secured to said stem between said constrictions, an expansion spring encircling said stem and operable between one restrictions and the flange, an outlet for the casing contained within that portion of the stem operable through the other constriction normally closed by the action of the spring, and means whereby the stem may be moved against the spring aforesaid to open said outlet.

3. A valve comprising a hollow valve casing having inlet means and a constriction adjoining each of its ends, a stem mounted for reciprocation in said constrictions, a transverse flange secured to said stem between said constrictions, an expansion spring encircling said stem and operable between one constriction and the flange, a seal carried by the stem adjacent the flange in opposition to the spring to be brought into sealing contact with the other constriction by said spring, outlet means contained within that portion of the stem operable through the last said constriction to be normally closed by the action of the spring and sealed as aforesaid, and means for moving the stem against the action of the spring to open said outlet means.

4. In a valve the combination with a base having a central passage extending through it, of a hollow valve casing secured at one end to said base, a closure for the opposite end of said casing having an opening therein concentric to the casing and the passage in the base, a valve stem mounted for reciprocation in the base and closure; a flange fixed to the stem between the closure and the base having a diameter substantially equal to the inner diameter of the casing, a spring encircling the stem between the flange and said closure acting normally to seat the flange adjacent the base, and means for establishing communication between the interior of the casing and the exterior of the base upon the reciprocation of the stem to move the flange out of its normal position, said means being inoperative when the flange is normally positioned adjacent the base.

5. The combination with a base having a central passage extending through it, of a hollow valve casing secured at one end to said base and having inlet openings in the wall thereof, a closure for the opposite end of said casing having an opening therein concentric to the casing and the passage in the base, a valve stem mounted for limited reciprocation in the base and closure, that part of the stem associated with the base having a longitudinal passage therein and lateral openings in communication with its inner end, a flange fixed to the stem between the closure and the base having a diameter substantially equal to the inner diameter of the casing, a spring encircling the stem between the flange and said closure acting to normally seat the flange adjacent the base and said lateral openings in the passage of the base, and a locking mechanism for retaining the stem and flange in position with the latter elevated from the base and the lateral openings of the stem exposed within the casing.

6. In a drain valve the combination with a base having a central passage extending through it, of a hollow valve casing secured at one end to said base and having inlet openings in its wall adjacent the base, a closure for the opposite end of said casing having an opening therein concentric to the casing and the passage in the base, a valve stem mounted for reciprocation and partial rotation in the base and closure and embodying an outlet in that portion thereof associated with the base, a flange fixed to the stem between the closure and the base having a diameter substantially equal to the inner diameter of the casing, a spring encircling the stem between the flange and said closure acting to normally seat the flange adjacent the base and close said outlet embodied in the stem, and a lock interposed between the stem and the closure operable only after the reciprocation of the stem to move the flange away from the base by bodily rotating the stem.

7. In a drain valve the combination with a base having a central passage extending through it, of a hollow valve casing secured at one end to said base having at least one inlet opening in its wall adjoining the base, a closure for the opposite end of said casing having an opening therein concentric to the casing and the passage in the base and at least two radially aligned grooves in its outer face, a stem mounted for reciprocation and rotation in the base and closure having a longitudinal passage in the end thereof remote from the closure and lateral openings at the inner end of said passage; a flange fixed to the stem between the closure and the base having a diameter substantially equal to the inner diameter of the casing, a spring encircling the stem between the flange and said closure acting to normally seat the flange adjacent the base and position the lateral openings of the stem within the passage of the base, a transverse pin secured to the stem outwardly of the closure to be normally seated in the aligned grooves of the latter upon the positioning of the flange adjacent the base by the spring, and means to reciprocate the stem against the action of the spring to move the flange away from the base and expose the lateral openings of the stem and to rotate the stem thus moved to position the pin aforesaid over the portions of the outer face of the closure situated between said grooves.

8. The combination with a hollow aircraft component normally disposed in the air-stream and having a drain opening in its skin, of a support positioned within said component in association with said opening and having its outer face substantially flush with the skin of the component defining said opening and also having an outlet passage therein for communication with the interior of the component, a drain valve carried by the support and situated wholly within the component to control the outlet passage in the support, means for normally maintaining said valve closed to seal said outlet passage of the support, and means, whereby the valve may be manually operated from the exterior of the component to establish communication through the outlet passage between the interior and exterior of said component.

9. The combination with a hollow aircraft component having a drain opening in its skin, of a tubular fitting, closed at one end by a bottom wall having a threaded aperture therein and situated within the component with its aperture in registration with said drain opening, a valve casing threaded into said aperture to project into the fitting disposed within said component and having its outer end substantailly flush with the outer surface of the skin of the component, said valve casing having an outlet passage communicating with the exterior of the component, a valve within the casing, a valve stem secured to said valve and mounted for reciprocation within the casing the outer end portion of the stem being hollow and having a lateral opening at the inner end thereof, means to normally position the valve to close and seal said outlet passage and position the lateral opening of the hollow stem portion out of communication with the valve casing, and means whereby the valve stem may be reciprocated from the exterior of the component to move the valve from its normal position to the position where the lateral opening in the stem communicates with the interior of the valve casing.

MAURICE S. LIPMAN.

References Cited in the file of this patent

UNITED STATES PATENTS

| Number | Name | Date |
| --- | --- | --- |
| 726,031 | Cunningham | Apr. 21, 1903 |
| 1,463,735 | Varrieur | July 31, 1923 |
| 1,586,418 | Frederikson | May 25, 1926 |
| 1,611,666 | Nacey | Dec. 21, 1926 |
| 1,665,934 | Schieber | Apr. 10, 1928 |
| 1,737,123 | Page | Nov. 26, 1929 |
| 1,776,877 | Youkese | Sept. 30, 1930 |
| 1,793,850 | Halstead | Feb. 24, 1931 |
| 1,954,986 | Carlson | Apr. 17, 1934 |
| 2,195,213 | Heigis | Mar. 26, 1940 |
| 2,231,630 | Laddon | Feb. 11, 1941 |
| 2,417,342 | Bach | Mar. 11, 1947 |
| 2,487,073 | Schroeder | Nov. 8, 1949 |